Figure 1:
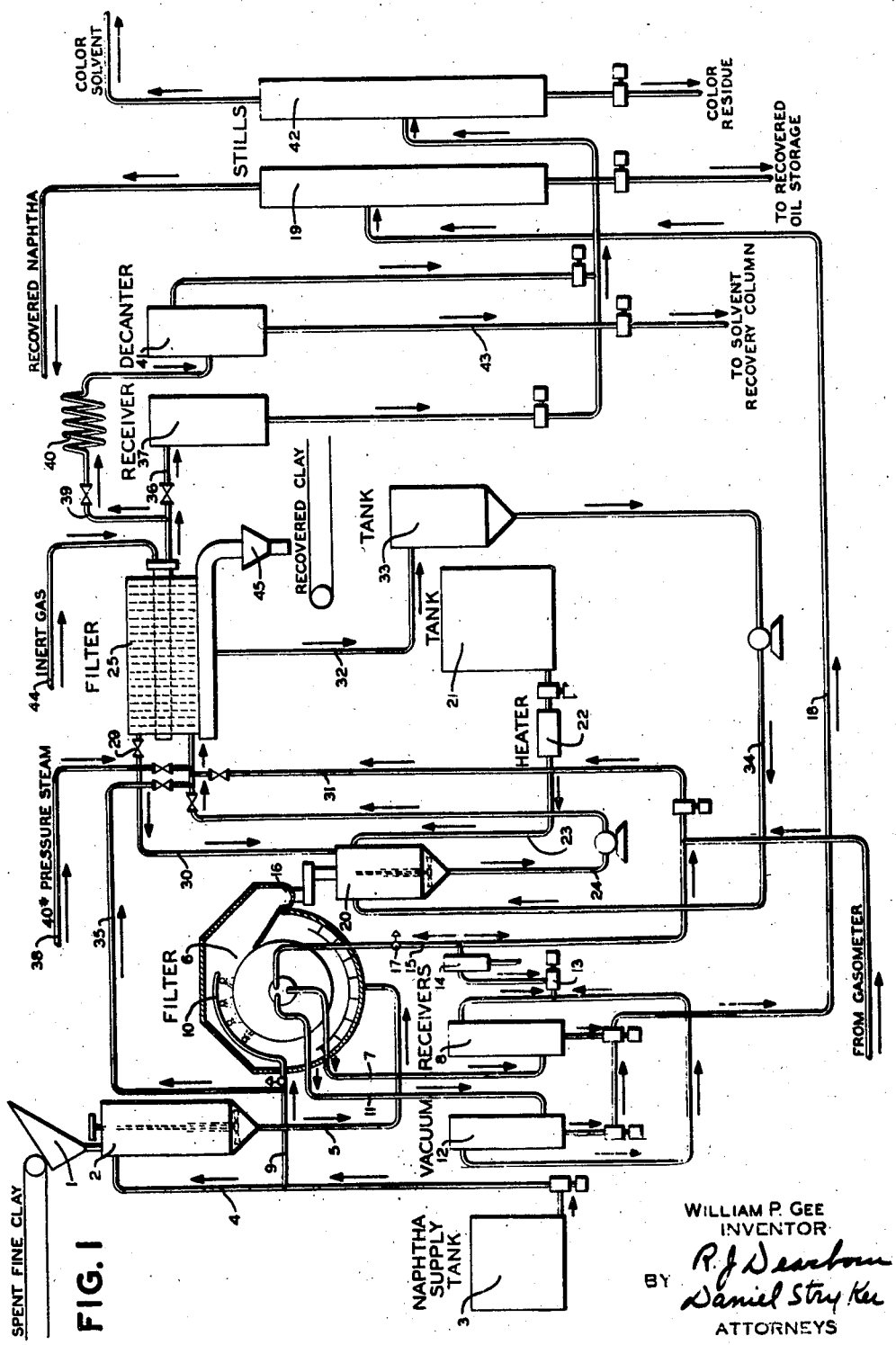

Patented Aug. 10, 1943

2,326,294

UNITED STATES PATENT OFFICE 2,326,294

CONTINUOUS PROCESS OF DECOLORIZING LUBRICATING OIL

William P. Gee, Plainfield, N. J., assignor, by mesne assignments, to The Texas Company, New York, N. Y., a corporation of Delaware Application September 26, 1939, Serial No. 296,568

5 Claims. (Cl. 196—147)

This invention relates to recovering and revivifying adsorbent materials used in treating hydrocarbon oils.

The invention broadly contemplates a process of removing coloring matter, oil, and other bodies adhering to or retained in solid decolorizing materials used in the treatment of hydrocarbon oils in order to revivify the decolorizing material substantially to its original decolorizing efficiency. More particularly, it concerns the removal of coloring matter and other impurities from earth or clay materials used in the treatment of oils such as derived from petroleum. The earth or clay materials in question may comprise fuller's earth, activated clays, acid treated clays, or other silicious materials such as magnesium silicates, for example. It is contemplated that the process is applicable to other types of adsorbent materials which are used to remove coloring matter from oils by adsorption.

In accordance with the invention, the used adsorbent material containing coloring matter, as well as other impurities, including some oil absorbed during contact with hydrocarbon oil, is treated with a solvent capable of dissolving the retained oil. The solvent and dissolved oil are removed, leaving a substantially oil-free or deoiled adsorbent material. The deoiled material is then treated with a solvent adapted to dissolve or displace the retained coloring matter. The solvent and dissolved matter are removed and the adsorbent material is then washed with another solvent, such as petroleum naphtha or other low-boiling petroleum fraction, to remove or displace retained color-removal solvent.

The invention is particularly applicable to the treatment of decolorizing clay such as used in the conventional clay contact treatment of mineral lubricating oils. The used clay contains a substantial amount of coloring matter and also retains a substantial amount of oil; for example, the spent or used clay may contain around 40 or 60% of oil by weight of the clay. It is therefore desirable to deoil the clay as a preliminary to solvent extraction for the removal of the coloring matter. The present invention contemplates a continuous process for deoiling and extraction of the coloring matter from the clay in order to revivify and recondition the clay for reuse.

An advantage of the invention is to accomplish this without subjecting the contact clay to excessive mechanical handling, since such handling results in injury to, and destruction of, the particle structure of the clay, which is particularly objectionable where the clay or earth is of a fragile nature.

A further advantage of the invention is the utilization of a closed continuous system adapted to reduce solvent losses and to effect recovery and revivification of the clay to a higher degree than heretofore and in a more effective manner.

In order to describe the invention more fully reference will now be made to the figures of the accompanying drawing, each of which comprises a flow diagram of the process of the invention.

Referring to Fig. 1, the spent clay used in the treatment of lubricating oil is conveyed to a hopper 1 attached to a wash tank 2 to which naphtha from a tank 3 is introduced through a pipe 4. The naphtha and clay are introduced to the tank 2 so as to form a mixture containing about 10-20% of clay by weight. Mixing is advantageously effected within the tank 2 by a slow-speed mixer.

The resulting mixture is fed continuously through a pipe 5 to a continuous drum-type totally enclosed vacuum filter 6. The filter is advantageously equipped with a paddle agitator in the bottom of the filter tank and under the filter drum.

The filtering operation is preferably conducted at temperatures below 130° F. in order to avoid excessive evaporation of naphtha in the vacuum system. The filter drum is operated with a submergence of about 40%.

The main filtrate is drawn in the conventional manner through a pipe 7 into a receiver 8.

The resulting filter cake is subjected to washing in situ to displace the oil solution from the cake. This is accomplished by drawing naphtha from the supply tank 3 through a pipe 9 and forcing it through the spray system 10 within the filter hood.

The wash filtrate so obtained is withdrawn from the filter through a pipe 11 to a vacuum receiver 12. Both receivers 8 and 12 are connected to a vacuum pump 13. The gases discharged from the vacuum pump may be cooled during passage through a water cooled aftercooler (not shown), and the resulting cooled gases introduced to a separator tank 14, wherein the condensed naphtha is collected and can be withdrawn therefrom and returned to storage.

The substantially dry gas, at normal temperature is conducted through a pipe 15 into the blowback port of the vacuum continuous filter and thus used for discharge of the clay cake from the filter surface into a conveyor 16.

The pressure of the gas is controlled by a pressure regulator 17 in order to maintain a constant blow-back pressure. Inert gas may be supplied to the system from a gasometer or other extraneous source, which is connected to a balance line communicating with the hood of the filter.

The filtrate from receivers 8 and 12 is pumped through a pipe 18 to a continuous distillation unit 19. The naphtha recovered in this unit is returned to the storage tank 3, while the residue, comprising recovered oil, may be pumped to oil storage or returned for recycling through the contact plant.

The deoiled filter cake containing naphtha is conveyed by the scroll conveyor 16 into a repulp tank 20 where it is mixed with a color-removal solvent such as acetone, methyl ethyl ketone and the like, or mixtures of these with naphtha. For example, a suitable mixture of ketone and naphtha may contain around 10 to 30% by volume of ketone. This solvent is pumped from a supply tank 21 through a heater 22 and pipe 23 to the tank 20. The solvent is mixed with the clay in tank 20 to form a mixture containing about 15 to 30% by weight of clay. The mixing is advantageously effected at a temperature above normal; for example, around 120° to 130° F. Mixing is effected by means of a low-speed mixer such as used in the tank 2.

The repulp tank 20 is advantageously of sufficient size to act as a surge tank for the subsequent filtering operation.

The mixture of clay and solvent is passed through pipe 24 to a pressure filter 25 which may be of the Vallez type.

In order to obtain even cake formation and best filtering results, formation of the cake is commenced by having valve 29 in the recirculating line 30 entirely open so that the charge entering the filter is recirculated through the filter back to the repulp tank 20. Valve 29 is closed slowly and pressure gradually built up until the desired cake thickness is formed; for example, the maximum filtering pressure may not exceed 40 pounds per square inch. This maximum pressure is maintained on the filter at the end of the cake-forming period by introducing high pressure inert gas from pipe 31. With this gas the excess fluid feed in the filter is blown back through a line 32 to a blow-back tank 33 from whence it is returned through a pipe 34 to the repulp tank 20.

After the cake-forming period the color-removal solvent is displaced from the cake by introducing naphtha to the filter through a pipe 35 communicating with the supply tank 3.

The main filtrate, as well as that obtained during displacement with naphtha, is withdrawn from the filter through a pipe 36 leading to a receiver 37.

After displacement of the color solvent from the filter cake is complete, the excess liquid in the filter is again blown back by the method described above, and returned to the repulp tank 20.

Thereafter steam is introduced to the filter through a pipe 38 for the purpose of recovering the naphtha retained in the cake. The steamings are passed out of the filter through a pipe 39 and through a cooler 40 to a tank or decanter 41.

The naphtha layer from this decanter tank, as well as the solvent liquid from the receiver 37, is pumped to a still 42.

The water layer from the decanter 41 is withdrawn through a pipe 43 and may be subjected to a distilling or fractionating operation for the purpose of recovering the ketone.

In the still 42 the solvent, i. e. ketone, ketone-naphtha, is distilled from the coloring matter which remains behind as residue. The recovered solvent is subsequently returned to the solvent supply tank 21, while the residue of coloring matter is withdrawn and may be disposed of as fuel or utilized in some other manner.

The dry recovered clay cake in the filter is discharged therefrom by introducing a blow-back of low pressure inert gas through a pipe 44 and the cake dropped into the bottom of the filter from which it is conveyed to a hopper 45 for reuse in the treatment of oil.

Figure 2:
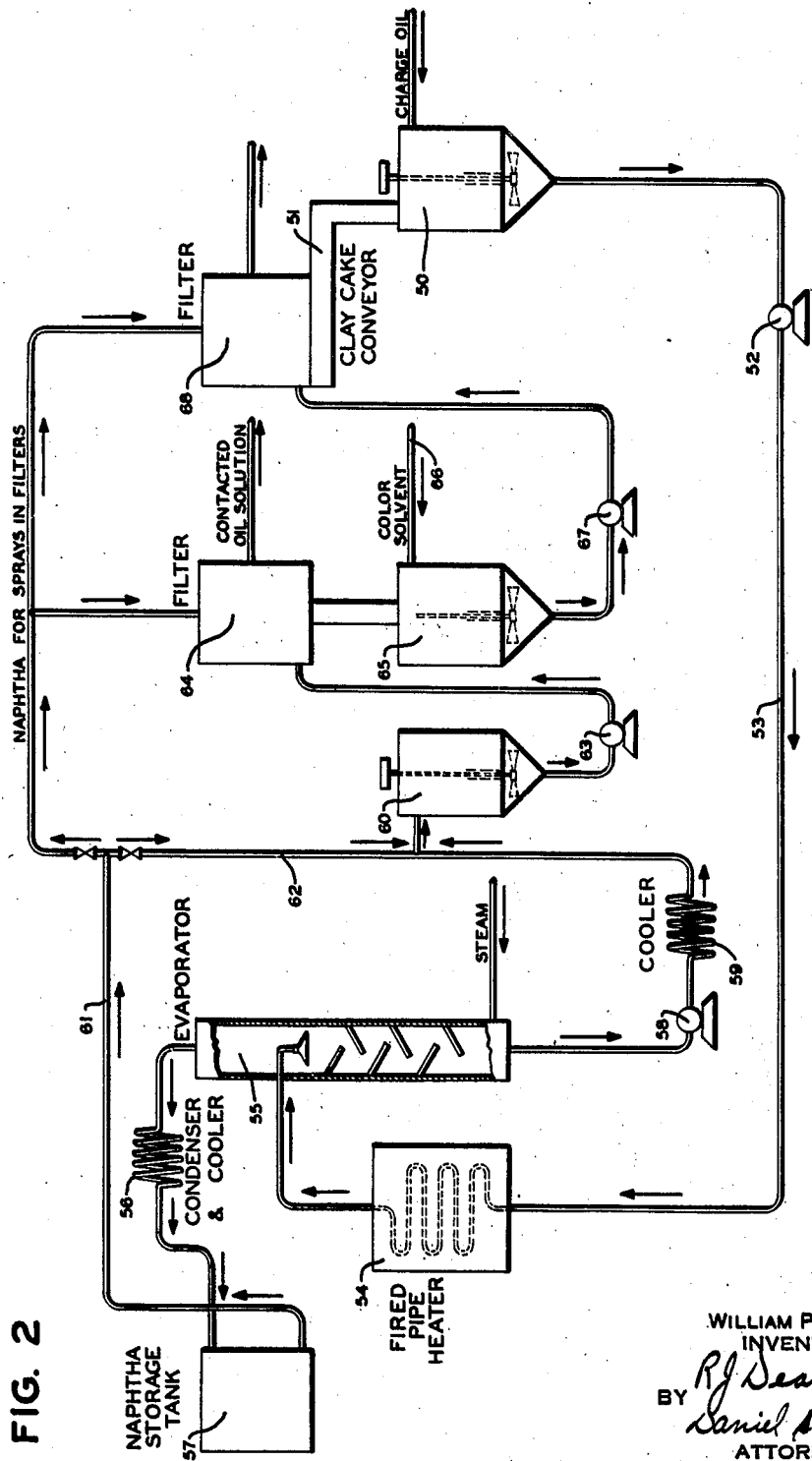

Fig. 2 illustrates a modification of the foregoing process as employed in direct conjunction with the clay contact treatment of lubricating oil stock.

The lubricating oil stock, such as a solvent extracted oil, is conducted from a source not shown and introduced to a mechanically agitated tank 50. Into this tank also flows naphtha laden recovered fine clay from a conveyor 51. The flow of the charge oil is so regulated that the proper proportion of decolorizing clay to oil is obtained in this tank.

The resulting mixture is pumped by a pump 52 through a pipe 53 to a heater 54, wherein the temperature is raised to the proper degree for contacting; for example, in the order of 400-500° F. when a high viscosity oil such as cylinder stock is being treated.

The hot oil and clay mixture from the heater flows into an evaporator 55, wherein the naphtha content of the mixture which was introduced with the recovered fine clay is flash evaporated. The vaporized naphtha is drawn off through a condenser 56 and, after condensation and cooling, passed to a naphtha storage tank 57.

The clay-oil mixture passes over inclined baffles within the evaporator 55 to facilitate more complete naphtha evaporation and to avoid settling out of the clay from the oil.

The clay and oil mixture is withdrawn from the bottom of the evaporator by a pump 58 and forced through a cooler 59 to a tank 60.

The cooler reduces the clay-oil mixture to such a temperature that naphtha can be introduced from the tank 57 through pipes 61 and 62 to the tank 60 without excessive evaporation.

The diluted clay-bearing mixture is then pumped from the tank 60 by a pump 63 to a totally enclosed continuous drum-type filter with or without a precoat. The oil solution is separated from the clay in this filter and the clay cake washed free of oil by displacement spray washing, such as previously described in connection with filter 6 of Fig. 1. The naphtha is subsequently evaporated from the decolorized oil.

The spent naphtha laden clay is conveyed from the filter 64 to a slurry tank 65 wherein it is mixed with the color-removal solvent, containing ketone, introduced through a pipe 66. The resulting mixture is withdrawn from the tank 65 by a pump 67 and fed to a continuous vacuum drum-type filter 68 where the solvent is separated from the clay.

The clay cake is washed in situ with naphtha to displace retained color-removal solvent.

The recovered naphtha laden clay cake is discharged from the filter through the conveyor 51, previously referred to, and which discharges into the tank 50.

Obviously many modifications and variations of the invention, as hereinbefore set forth, may be made without departing from the spirit and scope thereof and therefore only such limitations should be imposed as are indicated in the appended claims.

I claim:

1. A continuous process of decolorizing lubricating oil by contact with clay wherein the used clay is reconditioned and subsequently subjected to decolorizing contact with additional raw oil, comprising continuously diluting a mixture of the oil and clay, which has been subjected to said decolorizing contact, with petroleum naphtha, passing the diluted mixture to a continuous rotary vacuum filter, thereby separating treated decolorized oil and diluent as a filtrate and forming a filter cake of clay retaining coloring matter and some oil, washing said cake in situ with naphtha to remove retained oil, removing the washed filter cake, mixing the removed cake with a solvent comprising a low boiling aliphatic ketone, passing the resulting mixture to a continuous rotary vacuum filter wherein solvent and dissolved coloring matter are removed as a filtrate and a secondary filter cake of clay is formed, washing said secondary cake in situ with naphtha to remove retained ketone as a wash filtrate, and forming a naphtha-laden clay cake, removing said naphtha-laden clay cake, commingling said naphtha laden clay with raw oil, heating the mixture to an elevated temperature in the range substantially above atmospheric and up to about 500° F. to effect substantial decolorization of the oil, said temperature being such that naphtha can be vaporized from the mixture, vaporizing naphtha from the heated mixture while the oil and clay remain in intimate contact under decolorizing conditions, and thereafter substantially reducing the temperature of the mixture of oil and clay prior to the aforesaid dilution and filtration to separate the decolorized oil from the clay.

2. A continuous process of decolorizing lubricating oil by contact with clay wherein the used clay is reconditioned and subsequently subjected to decolorizing contact with additional raw oil, comprising continuously diluting a mixture of the oil and clay, which has been subjected to said decolorizing contact, with petroleum naphtha, passing the diluted mixture to a continuous rotary vacuum filter, thereby separating treated decolorized oil and diluent as a filtrate and forming a filter cake of clay retaining coloring matter and some oil, washing said cake in situ with naphtha to remove retained oil, removing the washed filter cake, mixing the removed cake with a solvent comprising a low boiling aliphatic ketone, passing the resulting mixture to a continuous rotary vacuum filter wherein solvent and dissolved coloring matter is removed as a filtrate and a secondary filter cake of clay is formed, washing the secondary filter cake in situ with naphtha to remove retained ketone as a wash filtrate, and forming a naphtha-laden clay cake, commingling the said naphtha-laden clay cake with raw oil, heating the mixture to a temperature of about 400 to 500° F., passing the heated mixture to an evaporator wherein naphtha is evaporated therefrom while the oil and clay remain in intimate contact under decolorizing conditions, and thereafter cooling the remaining mixture of oil and clay prior to the aforesaid dilution and filtration to separate the decolorized oil from the clay.

3. A continuous process for decolorizing lubricating oil by contact with clay wherein the used clay is reconditioned and subsequently subjected to decolorizing contact with additional raw oil, comprising continuously diluting a mixture of the oil and clay, which has been subjected to said decolorizing contact, with petroleum naphtha, passing the diluted mixture to a continuous rotary vacuum filter, thereby separating treated decolorized oil and diluent as a filtrate and forming a filter cake of clay retaining coloring matter and some oil, washing said cake in situ with naphtha to remove retained oil, removing the washed filter cake, mixing the removed cake with a color solvent more volatile than naphtha and capable of extracting from the clay the coloring matter adsorbed from the oil, passing the resulting mixture to a continuous rotary vacuum filter wherein color solvent and dissolved coloring matter is removed as a filtrate and a secondary filter cake of clay is formed, washing the secondary filter cake in situ with naphtha to remove color solvent as a wash filtrate, and forming a naphtha laden clay cake, commingling the said naphtha laden clay cake with raw oil, heating the mixture to a temperature of about 400 to 500° F., passing the heated mixture to an evaporator wherein naphtha is evaporated therefrom while the oil and clay remain in intimate contact under decolorizing conditions, and thereafter cooling the remaining mixture of oil and clay prior to the aforesaid dilution and filtration to separate the decolorized oil from the clay.

4. In a process for decolorizing lubricating oil involving treatment of the oil with decolorizing earth in the presence of naphtha wherein spent earth is removed from the oil, reactivated by washing with solvents including naphtha and a color solvent more volatile than naphtha, said color solvent being capable of extracting from the earth the coloring matter adsorbed from the oil, and the reactivated earth laden with naphtha is subjected to decolorizing contact with raw oil, the steps comprising continuously diluting a mixture of the oil and earth which has been subjected to said decolorizing contact with petroleum naphtha, separating the earth from the decolorized oil and diluent, washing the separated earth with naphtha to remove retained oil, subjecting the naphtha washed earth to contact with the color solvent in the form of a slurry to remove coloring matter, washing the color solvent treated earth with naphtha to obtain a reactivated naphtha laden earth, commingling said naphtha laden earth with raw oil, heating the mixture to an elevated temperature in the range substantially above atmospheric and up to about 500° F. to effect substantial decolorization of the oil, said temperature being such that naphtha can be evaporated from the mixture, passing the heated mixture to an evaporator wherein naphtha is evaporated therefrom while the oil and eath remain in intimate contact under decolorizing conditions, and thereafter cooling the remaining mixture of oil and earth prior to the aforesaid dilution and treatment to separate the decolorized oil from the earth.

5. The method according to claim 4 in which the mixture of naphtha laden earth and raw oil is heated to a temperature in the range about 400 to 500° F. to effect decolorizing of the oil.

WILLIAM P. GEE.